United States Patent
Jensen

(10) Patent No.: US 8,285,456 B2
(45) Date of Patent: Oct. 9, 2012

(54) SYSTEM FOR CONTROLLING A MULTIMACHINE CARAVAN

(75) Inventor: Jeffrey Edward Jensen, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 1167 days.

(21) Appl. No.: 12/073,176

(22) Filed: Feb. 29, 2008

(65) Prior Publication Data

US 2009/0222186 A1   Sep. 3, 2009

(51) Int. Cl.
*G06F 7/70* (2006.01)

(52) U.S. Cl. ............ 701/48; 701/50; 180/14.1; 180/169

(58) Field of Classification Search ............. 701/41, 701/48, 50; 180/14.1, 167, 169
See application file for complete search history.

(56) References Cited

U.S. PATENT DOCUMENTS

| | | | |
|---|---|---|---|
| 5,295,551 A * | 3/1994 | Sukonick | 180/167 |
| 5,315,515 A | 5/1994 | Schmitz | |
| 6,148,255 A | 11/2000 | van der Lely | |
| 6,246,932 B1 | 6/2001 | Kageyama et al. | |
| 6,285,925 B1 | 9/2001 | Steffen | |
| 6,351,697 B1 | 2/2002 | Baker | |
| 6,484,083 B1 | 11/2002 | Hayward et al. | |
| 6,494,476 B2 * | 12/2002 | Masters et al. | 280/426 |
| 6,587,772 B2 | 7/2003 | Behnke | |
| 6,640,164 B1 | 10/2003 | Farwell et al. | |
| 6,679,181 B2 * | 1/2004 | Fox | 104/20 |
| 7,046,126 B2 | 5/2006 | Flick | |
| 7,277,784 B2 | 10/2007 | Weiss | |
| 7,831,345 B2 * | 11/2010 | Heino et al. | 701/23 |
| 2005/0060066 A1 | 3/2005 | Buehler et al. | |
| 2006/0047377 A1 | 3/2006 | Ferguson et al. | |
| 2006/0047418 A1 | 3/2006 | Metzler et al. | |
| 2006/0089764 A1 | 4/2006 | Filippov et al. | |
| 2006/0229804 A1 | 10/2006 | Schmidt et al. | |
| 2006/0271251 A1 | 11/2006 | Hopkins | |
| 2007/0198159 A1 | 8/2007 | Durkos et al. | |

FOREIGN PATENT DOCUMENTS

JP   02076009   3/1990
JP   02750520   2/1998

* cited by examiner

*Primary Examiner* — Kevin Hurley
(74) *Attorney, Agent, or Firm* — Finnegan, Henderson, Farabow, Garrett & Dunner LLP

(57) ABSTRACT

A control system is disclosed. The control system includes a first set of operator input devices and a laser target located on a first machine. The control system also includes a first laser measurement system located on a second machine and configured to measure a distance to the laser target. The control system further includes a communications system configured to selectively communicate a first mode of operation and a second mode of operation. In the first mode of operation, the second machine follows the first machine based on the measured distance. In the second mode of operation, the second machine moves based on a signal from the first set of operator input devices.

17 Claims, 5 Drawing Sheets

SYSTEM FOR CONTROLLING A MULTIMACHINE CARAVAN

TECHNICAL FIELD

The present disclosure relates generally to a control system, and more particularly, to a control system for a multimachine caravan.

BACKGROUND

Mining and large scale excavating operations may require fleets of machines to transport excavated material, such as ore or overburden, from an area of excavation to a destination. For such an operation to be productive and profitable, the fleet of machines must be efficiently operated. One way to increase the efficiency of a fleet of machines is to reduce the number of operators required to operate the fleet by, for example, using autonomous or semi-autonomous machines.

A method of operating a semi-autonomous machine is disclosed in U.S. Pat. No. 7,277,784 (the '784 patent), issued to Weiss et al. The '784 patent discloses a method of operating a manned harvester and an unmanned transport machine. The unmanned transport machine contains a control unit, connected to a receiving unit that is configured to receive position data from the harvester. The control unit operates the transport machine based on the position data from the harvester and, for example, drives the transport machine parallel to the harvester.

Although the method of operating a semi-autonomous machine of the '784 patent may increase the efficiency of a fleet by reducing the number of required operators, the method may not be appropriate for operating a multimachine caravan in an excavating operation. In particular, the method may be incapable of increasing the following machine's engine power when, for example, traversing a grade. Furthermore, the method of communicating position data from a lead machine to the following machine may be impractical for use with multiple unmanned machines following a manned machine in series, for example, with a multimachine caravan traveling along a haul road.

The present disclosure is directed to overcoming one or more of the shortcomings set forth above.

SUMMARY

In one aspect, the present disclosure is directed to a control system. The control system includes a first set of operator input devices and a laser target located on a first machine. The control system also includes a first laser measurement system located on a second machine and configured to measure a distance to the laser target. The control system further includes a communications system configured to selectively communicate a first mode of operation and a second mode of operation. In the first mode of operation, the second machine follows the first machine based on the measured distance. In the second mode of operation, the second machine moves based on a signal from the first set of operator input devices.

In another aspect, the present disclosure is directed to a method of operating a machine. The method includes determining a distance and a direction to a target and communicating a control signal to the machine from a remote machine. The method further includes actuating at least one of a brake, acceleration, or steering control system of the machine based on at least one of the determined distance and direction or the control signal.

In yet another aspect, the present disclosure is directed to another method of operating a machine. The method includes selecting a first mode of operation or a second mode of operation. In the first mode of operation, the method includes controlling the machine based on a determined distance and direction with respect to a lead machine. In the second mode of operation, the method includes controlling the machine based on a signal received from the lead machine.

DETAILED DESCRIPTION

Figure 1:
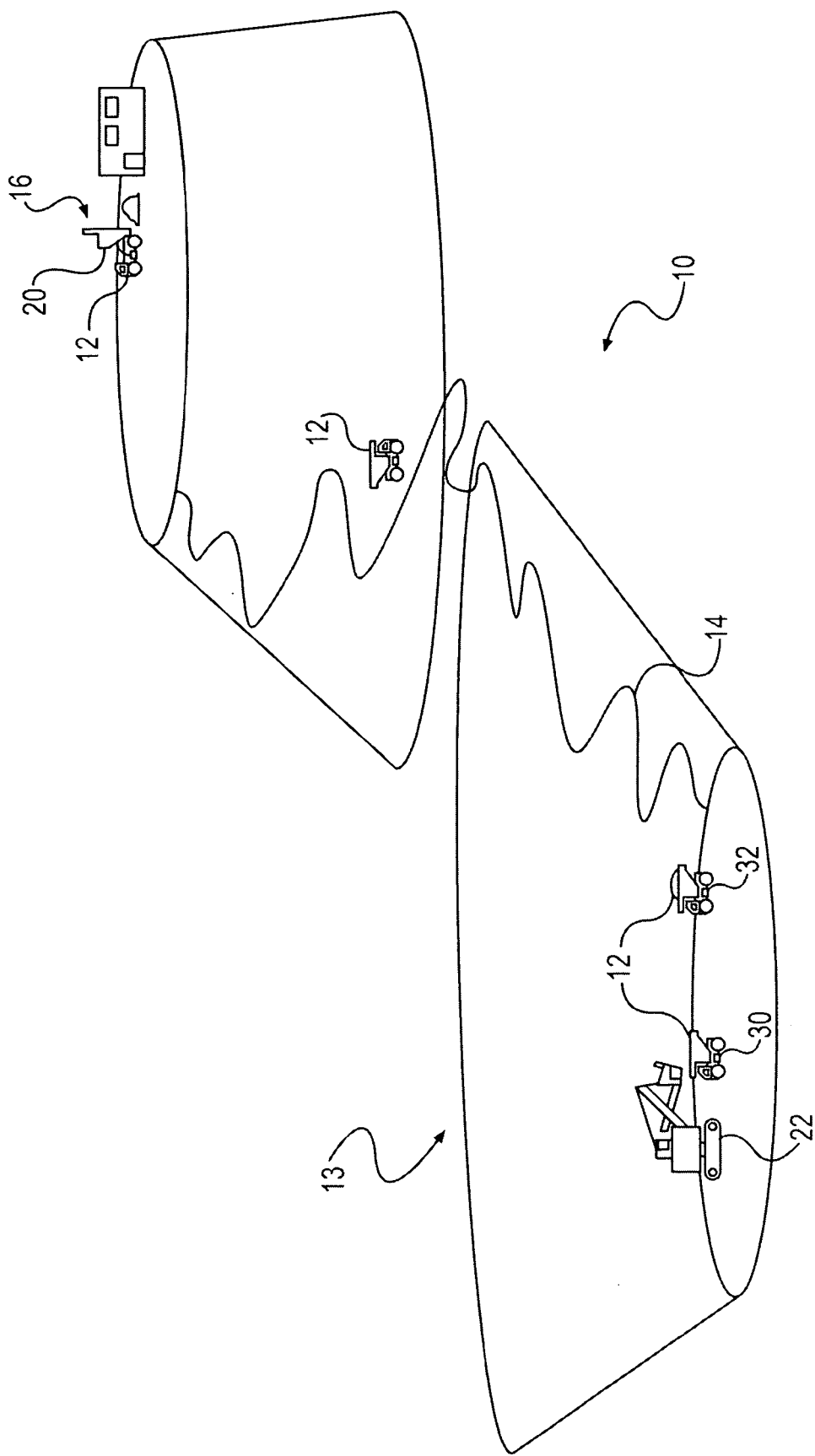
FIG. 1 is a diagrammatic illustration of an exemplary disclosed worksite.

FIG. 1 illustrates an exemplary worksite 10 with a fleet of machines 12 performing a predetermined task. Worksite 10 may include, for example, a mine site, a landfill, a quarry, a construction site, a roadwork site, or any other type of worksite. The predetermined task may be associated with any work activity appropriate at worksite 10, and may include machines 12 generally traversing the worksite 10. For example, the fleet of machines 12 may travel from an area of excavation of an open pit mine 13 along a haul route 14 to a processing region 16. In the open pit mine 13, another machine 22 may operate to excavate material, e.g., ore or overburden, and may load the excavated material into the machines 12. The machines 12 may carry a payload, e.g., the excavated material, when traveling from the open pit mine 13 to the processing region 16. In an exemplary haul cycle, a payload may be loaded onto the machine 12, the machine 12 may travel along haul route 14 from the mine 13 to the processing region 16, the payload may be unloaded from the machine 12, and the machine 12 may travel along haul route 14 back to the mine 13 from the processing region 16.

The machine 12 may be an off-road machine. The disclosed embodiment may be applicable to other types of machines such as, for example, other earth moving machinery capable of carrying a payload. The disclosed embodiment may also be applicable to a mobile machine that performs some type of operation associated with an industry such as mining, construction, farming, transportation, or any other industry known in the art. For example, the machine may be a commercial vehicle, such as a truck, crane, earth moving machine, mining machine, material handling equipment, farming equipment, marine vessel, aircraft, an excavator, a dozer, a loader, a backhoe, a motor grader, a dump truck, or any type of machine that operates in a work environment such as a construction site, mine site, power plant, etc.

Figure 2:
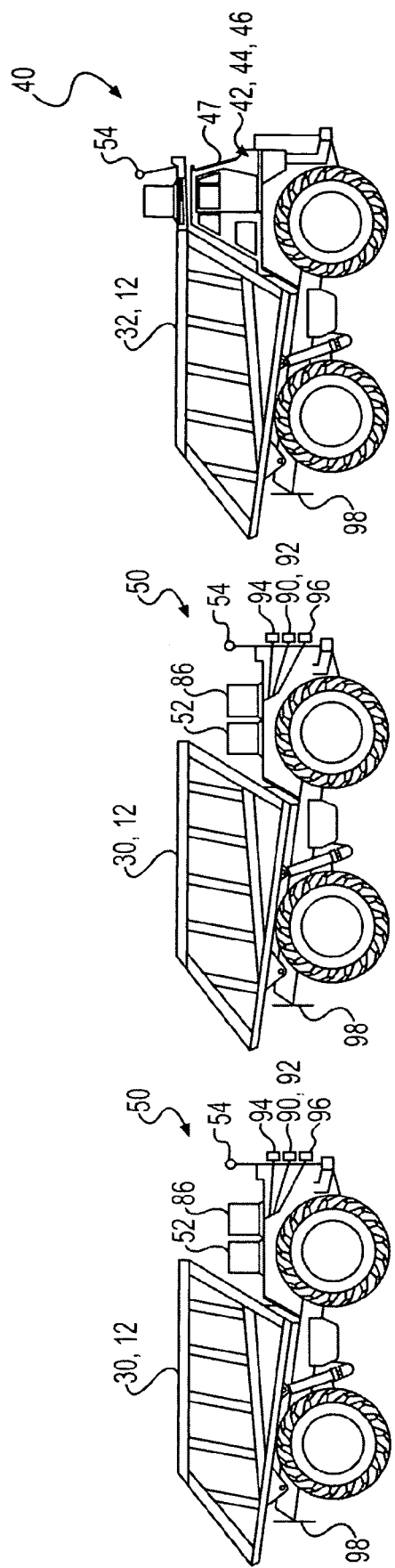
FIG. 2 is a diagrammatic illustration of a plurality of machines operable within the worksite of FIG. 1.

Referring to FIG. 2, in order to reduce the number of operators required for operation of the fleet of machines 12, it may be desirable for one or more unmanned (or second or additional) machines 30 to follow a lead manned (or first) machine 32 in series to form a multimachine caravan. A control system 40 may be configured to affect control of the multimachine caravan for this purpose. The control system 40 may include a primary operator input system 42 having operator input devices, an auxiliary operator input system 44 having operator input devices, and a display 46, each located in a cab 47 of the lead manned machine 32. That is, auxiliary operator input system 44 may have a first set of operator input devices and primary operator input system 42 may have a second set of operator input devices. The control system 40 may also include a laser measurement system 50 and an actuator system 52 mounted onboard each unmanned machine 30, and a communications system 54 for communicating signals between the machines 30, 32. Although two unmanned machines 30 are shown in FIG. 2, it is contemplated that the multimachine caravan may include a single unmanned machine 30 or more than two unmanned machines 30.

The control system 40 may include a first mode of operation and a second mode of operation. In the first mode, the unmanned machines 30 may follow a lead machine 32 without direct control from an operator (i.e. independent of input from the manned machine 32). Thus, the first mode may be useful, for example, when the machines 12 are traveling along the haul route 14. In the second mode, an operator may remotely control the unmanned machines 30 from the manned machine 32. The second mode may be useful, for example, when the machines 12 are operating at the open pit mine 13 or the processing region 16.

The actuator system 52 may be any control system capable of receiving an electronic signal and actuating the steering, brake, acceleration, and work implement control systems of the unmanned machine 30. For example, the actuator system 52 may be a drive-by-wire system, or another system known in the art. The actuator system 52 may additionally receive various input signals representative of the unmanned machine 30 system operating parameters including an engine speed signal from an engine speed sensor, a transmission input speed signal from a transmission input speed sensor, and a transmission output speed signal from a transmission output speed sensor. The sensors may be conventional electrical transducers, such as, for example, a magnetic speed pickup type transducer. These signals may be communicated to the manned machine 32 via the communications system 54 for display on display 46.

The communication system 54 may include communication elements, mounted on each of unmanned machines 30 and manned machine 32, to communicate operating parameters between the machines. For example, the communication system 54 may communicate the selection of the first or second mode of operation from the manned machine 32 to the unmanned machines 30. In the first mode of operation, the unmanned machines 30 may communicate position and speed to the manned machine 32. In the second mode of operation, control signals for braking, steering, and acceleration may be communicated from the auxiliary operator input system 44 to the actuator systems 52 of unmanned machines 30. The wireless communication system 54 may include a satellite data link, cellular data link, radio frequency data link, or other form of wireless data link.

The laser measurement system 50 may be mounted on unmanned machine 30 to determine the distance and direction to the next adjacent machine 12. The laser measurement system 50 may include a computer 86 connected to four lasers 90, 92, 94, 96. The lasers 90, 92, 94, 96 may be configured to reflect off of a laser target 98 mounted on the rear of the next adjacent machine 12. The computer 86 may include one or more maps storing, for example, ranges of desired distances from the unmanned machine 30 to the laser target 98. The computer 86 may include a number of conventional devices (not shown) including a microprocessor, a timer, input/output devices, and a memory device. Numerous commercially available microprocessors can be configured to perform the functions of computer 86. It should be appreciated that computer 86 could readily embody a computer system capable of controlling numerous other functions. Various other circuits may be associated with computer 86, including signal-conditioning circuitry, communication circuitry, and other appropriate circuitry as known in the art. It should be noted that a laser target 98 located on manned machine 32 may be a first laser target, that a laser target 98 on an unmanned machine 30 may be a second laser target, and that a laser measurement system 50 located on an unmanned machine 30 may be a first laser measurement system or a second laser measurement system.

Figure 3:
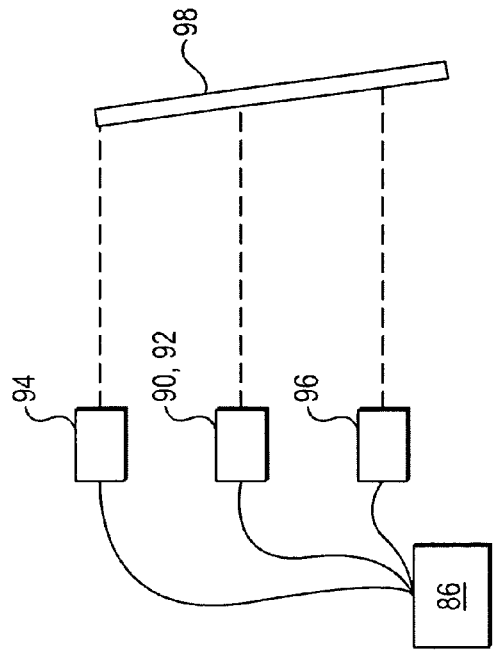
FIG. 3 is a perspective schematic illustration of an operation of the plurality of machines of FIG. 2.
Figure 4:
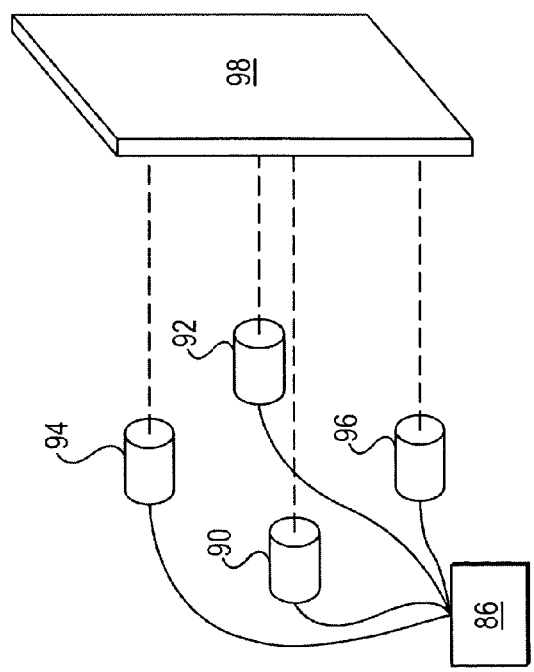
FIG. 4 is a right side view schematic illustration of another operation of the plurality of machines of FIG. 2.
Figure 5:
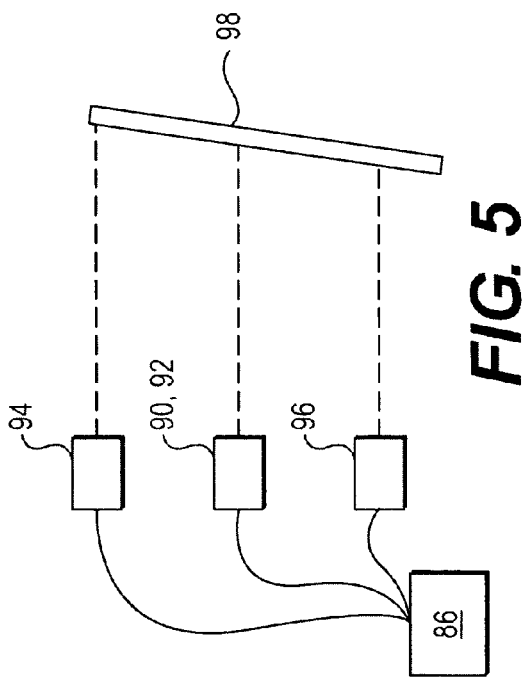
FIG. 5 is a right side view schematic illustration of another operation of the plurality of machines of FIG. 2.
Figure 7:
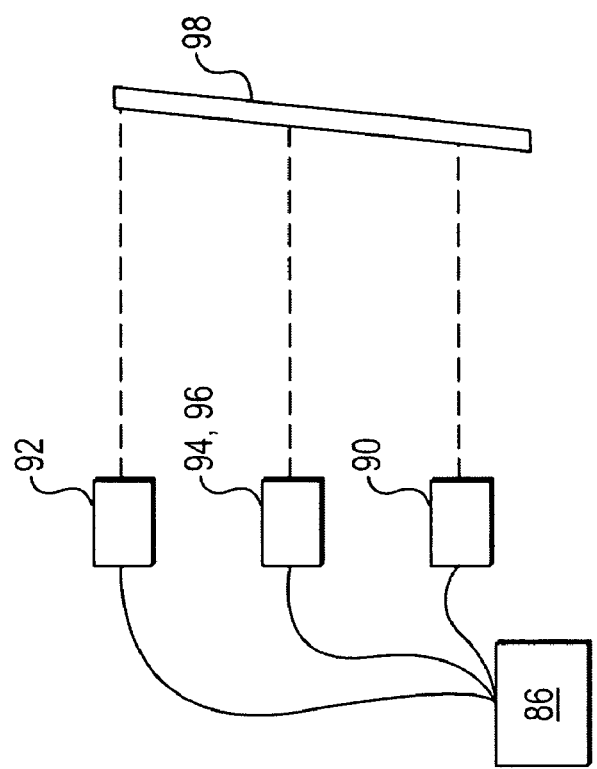
FIG. 7 is a top view schematic illustration of another operation of the plurality of machines of FIG. 2.
Figure 6:
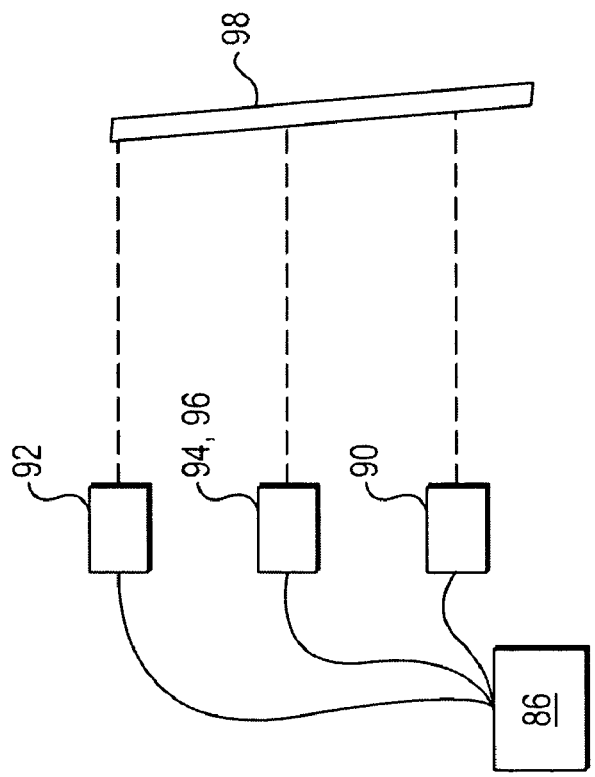
FIG. 6 is a top view schematic illustration of another operation of the plurality of machines of FIG. 2.

Referring to FIG. 3, the lasers 90, 92, 94, 96 may be mounted radially at intervals of approximately 90 degrees. In particular, laser measurement system may include a pair of right and left lasers 90, 92, respectively, generally aligned in the horizontal plane, and a pair top and bottom of lasers 94, 96, respectively, generally aligned in a vertical plane. In the first mode of control system 40, each laser 90, 92, 94, 96 may measure a distance between unmanned machine 30 and the target 98. Based on a difference measured between a pair of lasers 90, 92 or 94, 96, computer 86 may determine whether the target 98 is changing direction to the left or right, increasing or decreasing speed, or changing in elevation e.g., ascending or descending a grade. For example, the computer 86 may compare the measured distance to information stored in one of its maps and determine that because the distance has increased or decreased compared to a previous or desired distance, the speed of target 98 has changed. With this information, the computer system 86 may communicate to the actuator system 52 that a change in direction, acceleration, or braking is necessary to follow the target 98 at a predetermined distance that may be stored in one of its maps.

The laser measurement system 50 may be mounted on unmanned machine 30 to determine the distance and direction to the next adjacent machine 12. The laser measurement system 50 may include a computer 86 connected to four lasers 90, 92, 94, 96. The lasers 90, 92, 94, 96 may be configured to reflect off of a laser target 98 mounted on the rear of the next adjacent machine 12. The computer 86 may include one or more maps storing, for example, ranges of desired distances from the unmanned machine 30 to the laser target 98. The computer 86 may include a number of conventional devices (not shown) including a microprocessor, a timer, input/output devices, and a memory device. Numerous commercially available microprocessors can be configured to perform the functions of computer 86. It should be appreciated that computer 86 could readily embody a computer system capable of controlling numerous other functions. Various other circuits may be associated with computer 86, including signal-conditioning circuitry, communication circuitry, and other appropriate circuitry as known in the art. It should be noted that a laser target 98 located on manned machine 32 may be a first laser target, that a laser target 98 on an unmanned machine 30 may be a second laser target, and that a laser measurement system 50 located on an unmanned machine 30 may be a first laser measurement system or a second laser measurement system.

Figure 8:
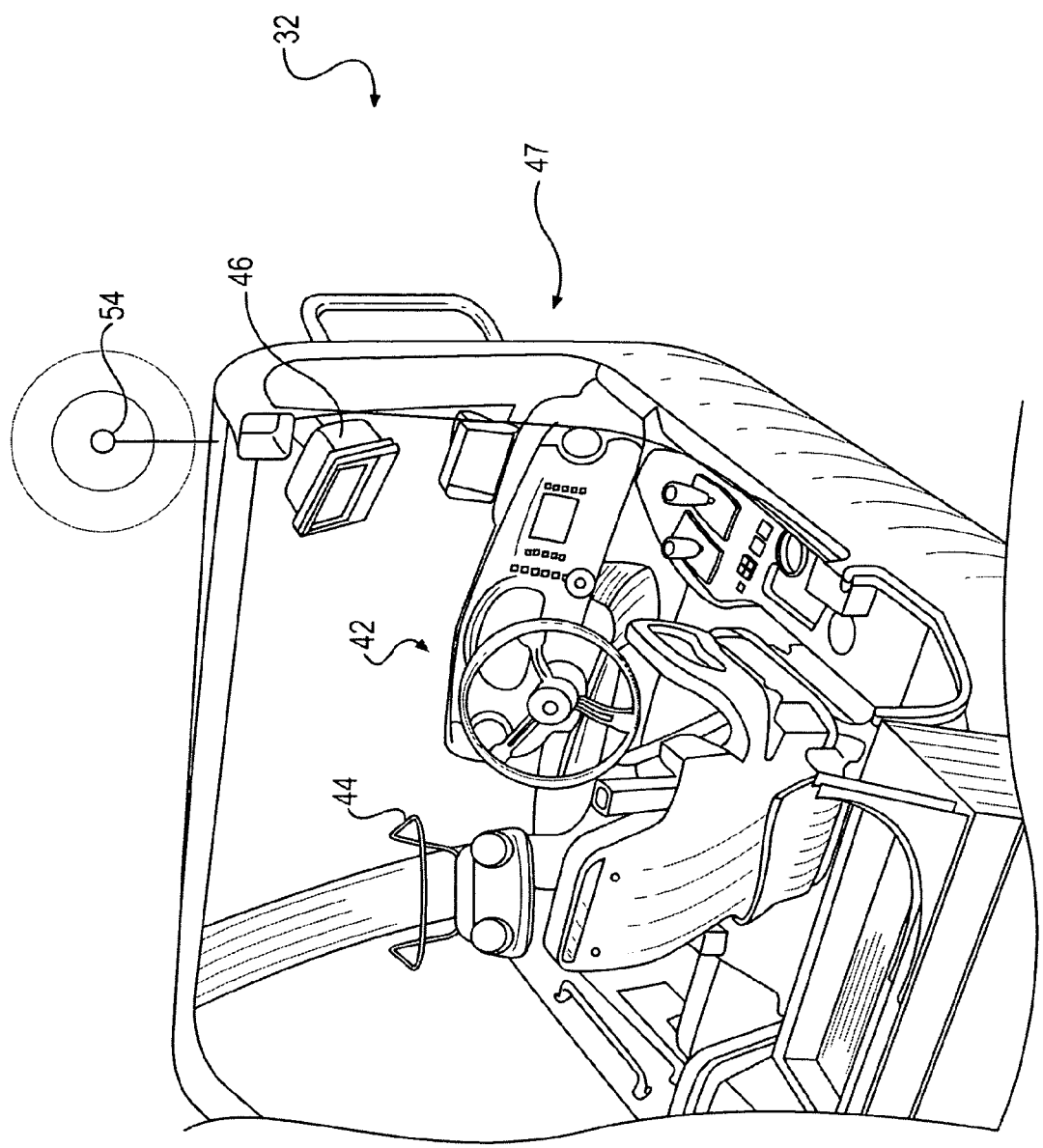
FIG. 8 is a diagrammatic illustration of an exemplary control system for use with one of the plurality of machines of FIG. 2.

A power source such as an electrical motor or a gasoline or diesel powered engine (not shown) may power the machines 12 as they move about the worksite 10 (referring to FIG. 1). Referring to FIG. 8, the movement of the manned machine 32 may be at least partially determined by the primary operator input system 42 located in the cab 47 of the manned machine 32. The primary operator input system 42 may include an acceleration control, a braking control, and a direction control. The acceleration control of the manned machine 32 may include, for example, an acceleration pedal and/or a deceleration pedal connected to control the power source and/or an associated transmission to accelerate or decelerate the manned machine 32. The braking control of manned machine 32 may include, for example, a brake pedal connected to a braking element to slow or stop manned machine 32. The direction control of the manned machine 32 may include, for example, a steering wheel, a joystick, or any other direction control known in the art configured to change the direction of the manned machine 32. It is contemplated that manned machine 32 may include any number of other components and features such as, for example, a traction device, an implement, or any other component or feature known in the art.

The auxiliary operator input system 44 may be connected to the communications system 54 for communicating control signals to the actuator systems 52 (referring to FIG. 2) onboard unmanned machines 30. The auxiliary operator input system 44 and/or the primary operator input system 42 may contain a toggle switch for selecting the first or second mode of operation. In addition, the auxiliary operator input system 44 may contain control inputs for acceleration, braking, direction, and implement control similar to those included in the primary operator input system 42. When the control system 40 is in the second mode, the outputs of the auxiliary operator input system 44 may be communicated via the communications system 54 as a control signal to the actuator systems 52, of unmanned machines 30 to affect control thereof. The actuator systems 52 may actuate brake, steering, acceleration, and work implement systems based on control signal received from the auxiliary operator input system 44. In an embodiment where more than one unmanned machine 30 is used, the auxiliary operator input system 44 may include an additional control (i.e. a switch) for selecting one or more unmanned machines 30 to remotely control in the second mode. For example, based on a control signal from auxiliary operator input system 44, one unmanned machine 30 may remain stationary while another unmanned machine 30 is controlled to move about the worksite 10.

Industrial Applicability

The disclosed method of controlling a multimachine caravan may be applicable to any fleet of machines. The disclosed method of controlling a multimachine caravan may increase the efficiency of the machine operation by reducing the number of operators required to operate a fleet of machines. Exemplary embodiments of the method of controlling a fleet of machines are described below.

Referring to FIG. 1, machines 12 may traverse worksite 10 to perform any operation associated with operation of worksite 10. Referring to FIG. 2, in order to reduce the number of drivers required to operate the machines 12, one or more unmanned machines 30 may form a caravan to follow a manned machine 32. Thus, an operator in manned machine 32 may use auxiliary operator input 44 to place control system 40 in the first mode of operation and the communication system 54 may communicate this mode of operation to the actuator systems 52 of unmanned machines 30.

In the first mode of operation, the laser measurement systems 50 onboard unmanned machines 30 may reflect off of the laser target 98 onboard the next adjacent machine e.g., the machine 12 in front of it. In order to establish contact, the operator of the manned machine 32 may position the unmanned machines 30 so that the lasers 90, 92, 94, 96 are in the line of sight of the target 98 mounted on the next adjacent machine 12, for example, by engaging the second mode of the control system 40 and remote controlling the unmanned machines 30 into position. Each of the lasers 90, 92, 94, 96 may be used to measure a distance from the unmanned machine 30 to the target 98. As discussed above, based on the differences in measured distances between each of the lasers 90, 92, 94, 96 and the laser target 98, the computer 86 may calculate a direction and distance from the unmanned machine 30 to the target 98. The computer may compare the distance information to a desired following distance stored in one of its maps and actuate the acceleration, braking, and directional control systems to maintain the desired following distance and direction behind the machine 12 on which the target 98 is mounted. Thus, the unmanned machines 30 may follow the manned machine 32 along a haul route.

While the control system 40 is in the first mode of operation, various operating parameters may be communicated from unmanned machines 30 to manned machine 32 via the communications system 54. For example, information regarding engine speed and distance of unmanned machine 30 to the next adjacent machine 12 may be displayed on display 46. In addition, the display 46 may display an indicator that each laser measurement system 50 is making distance measurements and/or a warning signal if the laser measurement system 50 fails to read a distance. If the laser measurement system 50 fails to read a distance, unmanned machine 30 may stop. If such a warning is displayed, the manned machine 32 may return to the location of the unmanned machine 30 to reestablish a link between the laser measurement system 50 and target 98.

When the manned machine 32 and the unmanned machines 30 reach the open pit mine 13 or the processing region 16, it may be desirable to place the control system 40 in the second mode of operation to initiate remote control of the unmanned machines 30. In the second mode, the operator may stop the manned machine 32 and control one or more of the unmanned machines 30 to move about the worksite 10 or use a work implement, for example to dump a load of ore or overburden. Thus, the operator may use the auxiliary operator input system 44 to place the control system 40 in the second mode and select one or more unmanned machines 30 to control remotely. The selected mode may be communicated to the selected unmanned machines 30 so that the actuator 52 actuates the acceleration, direction, braking, and implement control systems based on the control signal from the auxiliary operator input system 44.

It is further considered that in the second mode of control system 40 the auxiliary operator input system 44 may be used to control other unmanned machines at the worksite 10, for example, machine 22 (referring to FIG. 1). In this embodiment, the machine 22 may also include a communication element and a drive-by-wire system (not shown) to facilitate remote control by the auxiliary operator input system 44 in a manner similar to that discussed above.

The disclosed system may be an inexpensive, effective solution for reducing the number of operators required to operate a machine caravan. The control system may enable a single operator to navigate a fleet of machines in series along a haul route and remotely operate the fleet and/or other machines to load and unload materials. In addition, because no operator is required in the unmanned machine, the cab may be eliminated, substantially decreasing manufacturing cost of the machine.

It will be apparent to those skilled in the art that various modifications and variations can be made to the disclosed control system for a multimachine caravan. Other embodiments will be apparent to those skilled in the art from consideration of the specification and practice of the disclosed control system. It is intended that the specification and examples be considered as exemplary only, with a true scope being indicated by the following claims and their equivalents.

What is claimed is:

1. A control system, comprising:
   a first set of operator input devices located on a first machine;
   a first laser target located on the first machine;
   a first laser measurement system located on a second machine and configured to measure a distance to the first laser target; and
   a communications system configured to selectively communicate:
      from the first machine to the second machine a first mode of operation in which the second machine follows the first machine based on the measured distance; and
      from the first machine to the second machine a second mode of operation in which the second machine moves based on a signal from the first set of operator input devices.

2. The control system of claim 1, wherein the first set of operator input devices includes controls for actuating at least one of a steering, braking, acceleration, or implement control system of the second machine.

3. The control system of claim 1, further including a second set of operator input devices located on the first machine for controlling the movement of the first machine.

4. The control system of claim 1, wherein the laser measurement system includes at least four lasers configured to measure a distance to the first laser target.

5. The control system of claim 4, wherein a difference in the measured distance between two of the at least four lasers indicates a change in a direction of the first machine with respect to the second machine.

6. The control system of claim 5, wherein in the first mode of operation the second machine follows the first machine based on the change in direction.

7. The control system of claim 1, wherein the laser measurement system includes at least two lasers configured to measure a distance to the first laser target.

8. The control system of claim 1, further including an actuator system located on the second machine and configured to actuate at least one of a brake control system, an acceleration control system, and a steering control system of the second machine.

9. The control system of claim 8, wherein the actuator system is connected to at least one of the first laser measurement system and the communications system.

10. The control system of claim 1, wherein the communications system is configured to transmit the distance from the second machine to the first machine.

11. The control system of claim 1, wherein in the first mode of operation the second machine follows the first machine independent of input from the first machine.

12. The control system of claim 1 further including:
    a second laser target mounted on the second machine;
    at least one additional machine, wherein the additional machine includes a second laser measurement system configured to measure a distance to the second laser target; and
    wherein the additional machine is configured to move based on the measured distance to the second laser target and/or a signal from the first set of operator input devices.

13. The control system of claim 12, wherein the first set of operator input devices further includes a switch configured to selectively communicate the signals from the first set of operator input devices to the second machine and/or the at least one additional machine.

14. The control system of claim 1, wherein the selective communication of the first mode of operation and second mode of operation to the second machine includes communication of a selection of the first or second mode by an operator in the first machine.

15. A control system for a second machine, comprising:
    a laser measurement system located on the second machine, the laser measurement system configured to measure a distance to a first laser target located on a first machine; and
    a communications system located on the second machine, the communications system configured to selectively receive from the first machine:
       a selection of a first mode of operation in which the second machine follows the first machine based on the measured distance; and
       a selection of a second mode of operation in which the second machine moves based on control signals received from the first machine.

16. The control system of claim 15, wherein the laser measurement system includes at least four lasers configured to measure the distance to the laser target on the first machine.

17. The control system of claim 16, wherein a difference in the measured distance between two of the at least four lasers indicates a change in a direction of the first machine with respect to the second machine.

* * * * *